(12) United States Patent
Li et al.

(10) Patent No.: US 9,764,970 B2
(45) Date of Patent: Sep. 19, 2017

(54) OZONE CONTACT TANK AND OZONE CONTACT METHOD

(75) Inventors: Ji Li, Guangdong (CN); Wenyi Dong, Guangdong (CN)

(73) Assignee: HARBEN INSTITUTE OF TECHNOLOGY SHENZHEN GRADUATE SCHOOL, Shenzhen, Guangdong (CN)

( * ) Notice: Subject to any disclaimer, the term of this patent is extended or adjusted under 35 U.S.C. 154(b) by 0 days.

(21) Appl. No.: 13/807,751

(22) PCT Filed: Jan. 28, 2011

(86) PCT No.: PCT/CN2011/070718
§ 371 (c)(1),
(2), (4) Date: Dec. 31, 2012

(87) PCT Pub. No.: WO2012/088780
PCT Pub. Date: Jul. 5, 2012

(65) Prior Publication Data
US 2013/0270197 A1 Oct. 17, 2013

(30) Foreign Application Priority Data
Dec. 28, 2010 (CN) .......................... 2010 1 0609428

(51) Int. Cl.
*B01F 3/04* (2006.01)
*B01F 5/06* (2006.01)
*C02F 1/78* (2006.01)

(52) U.S. Cl.
CPC ............ *C02F 1/78* (2013.01); *B01F 3/04106* (2013.01); *B01F 3/04524* (2013.01);
(Continued)

(58) Field of Classification Search
CPC .... C02F 1/78; C02F 2303/04; C02F 2303/18; C02F 2301/022; C02F 2201/78;
(Continued)

(56) References Cited

U.S. PATENT DOCUMENTS

| | | | |
|---|---|---|---|
| 5,711,887 A * | 1/1998 | Gastman et al. | 210/748.1 |
| 2002/0117458 A1* | 8/2002 | Puetter et al. | 210/760 |
| 2011/0220558 A1* | 9/2011 | Joe et al. | 210/86 |

FOREIGN PATENT DOCUMENTS

KR 100890246 B1 * 3/2009

* cited by examiner

*Primary Examiner* — Lucas Stelling
(74) *Attorney, Agent, or Firm* — Jackson IPG PLLC; Demian K. Jackson

(57) ABSTRACT

The disclosure provides an ozone contact tank, which includes a water inlet gallery (1), an aeration gallery (2), a water distribution zone (3), a reaction zone (4) and a water outlet trough (5) which are disposed according to the intake order and are communicated in sequence; the top of the water inlet gallery (1) is communicated with the top of the aeration gallery (2); the bottom of the aeration gallery (2) is communicated with a water inlet end of the water distribution zone (3) via a narrow passage (6); the top of the water distribution zone (3) is communicated with the bottom of the reaction zone (4) via a perforated plate (41); the top of the reaction zone (4) is communicated with the water outlet trough (5). The disclosure also provides an ozone contact method using the ozone contact tank, which can greatly improve the disinfection effect.

2 Claims, 3 Drawing Sheets

(52) U.S. Cl.
CPC .. *B01F 5/0688* (2013.01); *B01F 2003/04886* (2013.01); *C02F 2201/78* (2013.01); *C02F 2301/022* (2013.01); *C02F 2303/04* (2013.01); *C02F 2303/18* (2013.01)

(58) Field of Classification Search
CPC ............ C02F 2201/784; B01F 3/04106; B01F 3/04524; B01F 5/0688; B01F 2003/04886
See application file for complete search history.

OZONE CONTACT TANK AND OZONE CONTACT METHOD

TECHNICAL FIELD OF THE INVENTION

The disclosure relates to a disinfection device for water treatment, and in particular to an ozone contact tank and an ozone contact method for the disinfection device in the water treatment.

BACKGROUND OF THE INVENTION

The ozone with strong oxidability can effectively oxidize and decompose organic pollutants, inactivate pathogenic microorganisms, and particularly inactivate cryptosporidium and giardia (G&C for short). The G&C greatly harms the public health, and the efficiency for inactivating the G&C via chlorine disinfection is very low; the United States had one of the most serious infectious events in 1993, causing that 1.5 million people were infected, 403,000 people were in sick, and nearly one hundred people died; therefore, the United States enacted a strict G&C water quality standard, and the ozonation process was rapidly applied in the United States after 1990s of the last century.

One of the most serious problems of the ozonation technical application is to sterilize the byproducts, especially the bromate can directly harm the human health. When the bromine ions with certain concentration exist in water, the bromate can be generated during the ozone oxidation process. The bromate is recognized as 2B-grade potential carcinogen by the International Agency for Research on Cancer (IARC), the drinking water standards provided by the World Health Organization, the U.S. Environmental Protection Agency (EPA) and the European Union limit the bromate standard to be 10 μg/L.

There is a positive relationship between the bromate generation and the disinfection efficiency, the problem that how to guarantee the biosafety (inactivation of G&C) and the chemical safety (bromate control) of ozonation process effluent needs to be urgently solved today as the ozonation process is increasingly popularized.

The ozone disinfection efficiency depends on the ozone concentration C and the disinfection contact time T. The complex G&C detection with long period cannot be online monitored in practical application; the inactivation efficiency depends on the CT value (product of the ozone concentration C and the disinfection contact time T) according to the disinfection dynamics, thus the CT value becomes an important basis of the disinfection efficiency. The first method of improving the CT value is to increase the ozone concentration, which means that the ozone dosage is increased, the operation cost is increased accordingly, and meanwhile the bromate generation is increased; the second method is to improve the utilization efficiency of ozone in water, which is realized by optimizing the ozone contact tank.

The ozone contact tank is a treatment structure which makes the ozone gas diffuse to the treatment water, to fully contact with the water, and to implement reaction; a high-efficient ozone contact tank can improve the disinfection efficiency, reduce the bromate generation and save the operation cost.

There are generally two methods of dissolving the ozone into water at home and abroad, one is aeration method, and the other is pipeline mixing mode. The ozone needs to maintain a certain retention period in the contact tank after dissolving in water to realize full disinfection, the best theoretical method is that the water dissolved with ozone flows through the ozone contact tank via plug flow mode. In order to realize the plug flow mode, the ozone contact tank is always designed with a vertical partition plate; a typical vertical partition plate type ozone contact tank includes multiple compartments which are connected in series to each other; the water in the compartments generally has two flow directions, namely, rising and falling directions. Such type has simple design and construction, and is easy to maintain; however, lots of researches and engineering practices show that this contact tank has quite serious short stream and back-mixing phenomenon, and low hydraulic efficiency, which can greatly influence the disinfection effect; in order to guarantee the disinfection effect, the ozone dosage must be increased, the operation cost is increased, and meanwhile, the bromate generation is increased to harm the health of residents. Thereby, the key of solving the problems of the existing ozone contact tank is to improve the flow state in the ozone contact tank to be closer to the plug flow mode, and to improve the uniform distribution degree of the ozone concentration in the water.

SUMMARY OF THE INVENTION

The disclosure provides an ozone contact tank and an ozone contact method for solving the problem that the ozone contact tank has low disinfection efficiency in the conventional art.

The disclosure provides an ozone contact tank, including a water inlet gallery, an aeration gallery, a water distribution zone, a reaction zone and a water outlet trough which are disposed according to the intake order and are communicated in sequence; the top of the water inlet gallery is a water outlet end, the top of the aeration gallery is a water inlet end, the top of the water inlet gallery is communicated with the top of the aeration gallery; the bottom of the aeration gallery is provided with an aerator, the top of the aeration gallery is provided with a first exhaust port, the bottom of the aeration gallery is communicated with a water inlet end of the water distribution zone via a narrow passage which is used for improving the liquid flow rate; the top of the water distribution zone is a water outlet end, the bottom of the reaction zone is a water inlet end, the top of the water distribution zone is communicated with the bottom of the reaction zone; a perforated plate is arranged between the top of the water distribution zone and the bottom of the reaction zone; the perforated plate is provided with a second communicating hole; the top of the reaction zone is communicated with the water outlet trough; the top of the reaction zone is covered by a cover plate; the cover plate is provided with a second exhaust port, and the second exhaust port is connected with an ozone exhaust destruction device via a pipeline.

As a further improvement of the disclosure, the top of the reaction zone is provided with triangular effluent weirs; and the triangular effluent weirs are communicated with the water outlet trough.

As a further improvement of the disclosure, the distance between centre lines of the two adjacent triangular effluent weirs is L, the total height of the reaction zone and the water distribution zone is H, thus L/H is less than 0.2.

As a further improvement of the disclosure, the total height of the reaction zone and the water distribution zone is 5 to 7 meters.

As a further improvement of the disclosure, the height of the water distribution zone is h, and h is 0.5 to 1.0 meter; the height of the narrow passage is a, and a is 0.10 to 0.20 meter.

As a further improvement of the disclosure, the perforated walls which are vertical to the water flow direction are arranged in the water distribution zone; and the perforated walls are provided with first communicating holes which are parallel with the water flow direction.

As a further improvement of the disclosure, at least two perforated walls are provided and are uniformly distributed with intervals; the first communicating holes are uniformly distributed on the perforated walls.

As a further improvement of the disclosure, the aeration direction of the aerator is opposite to the water flow direction of the aeration gallery, the water flow direction of the water inlet gallery is opposite to the water flow direction of the aeration gallery.

As a further improvement of the disclosure, the porosity of the perforated plate is 0.05 to 0.20; the aperture of the second communicating hole is 3 to 5 millimeters, and the second communicating holes are uniformly distributed on the perforated plate.

The disclosure also provides an ozone contact method, including the steps as follows:

A, guiding the water into the aeration gallery via the water inlet gallery for reverse aeration;

B, guiding the water in the aeration gallery into the water distribution zone via the narrow passage which can improve the liquid flow rate, and mixing the water in the narrow passage and the water distribution zone;

C, guiding the water in the water distribution zone upwards to the reaction zone via the perforated plate to implement reaction and disinfection;

D, draining the water in the reaction zone via the water outlet trough.

The advantages of the disclosure are that: via the above solution, the aeration gallery and the reaction zone are separated, which can prevent the water flow disturbance caused by aeration from influencing the hydraulic efficiency; the narrow passage between the water distribution zone and the aeration gallery makes the ozone water with different concentrations in the aeration gallery be fully and uniformly mixed in the water distribution zone; the perforated plate is set to make the water flow rate be uniform and stable; and the perforated plate can be combined with the effluent weir to realize the hydraulic flow state which is close to full plug flow mode in the reaction zone, thus greatly improving the disinfection effect; meanwhile, when guaranteeing a constant CT value, the ozone concentration C can be properly reduced because of increasing the disinfection time T, namely, the ozone aeration quantity can be reduced, which is helpful for controlling the disinfection cost.

DETAILED DESCRIPTION OF THE INVENTION

Figure 1:
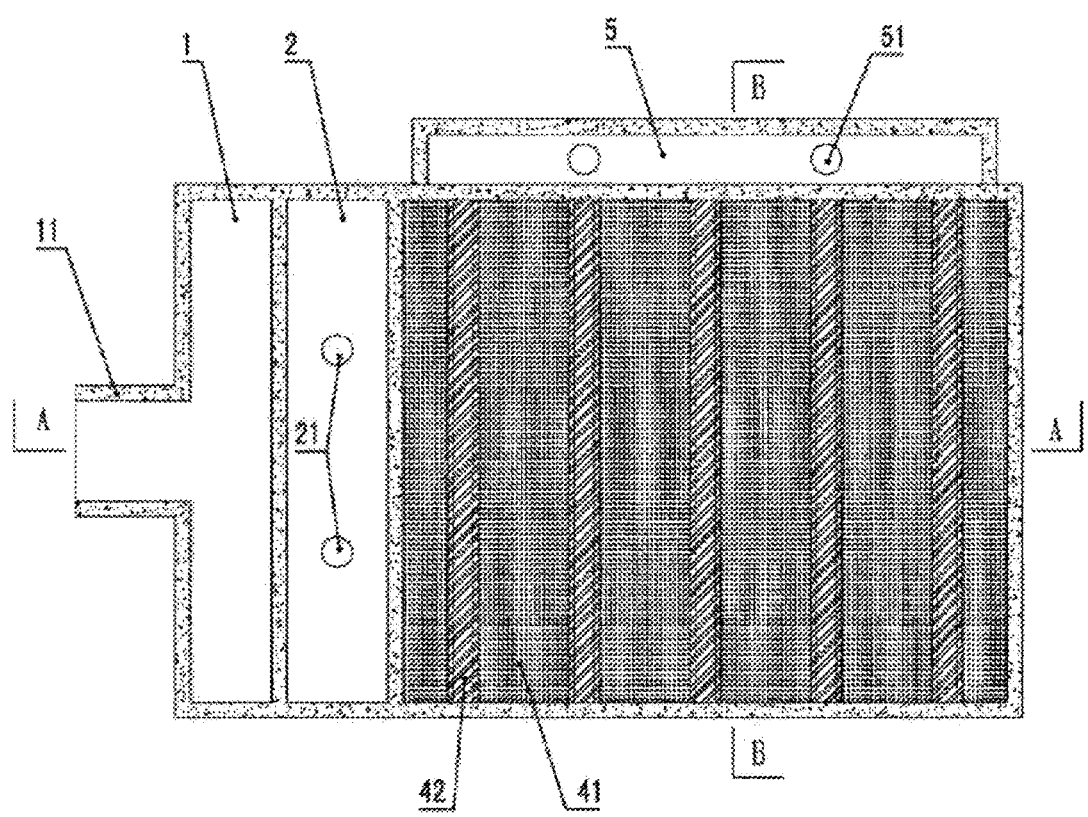
FIG. 1 shows a plane diagram of an ozone contact tank of the disclosure.

The disclosure is further described below with reference to the drawing descriptions and embodiments.

Figure 2:
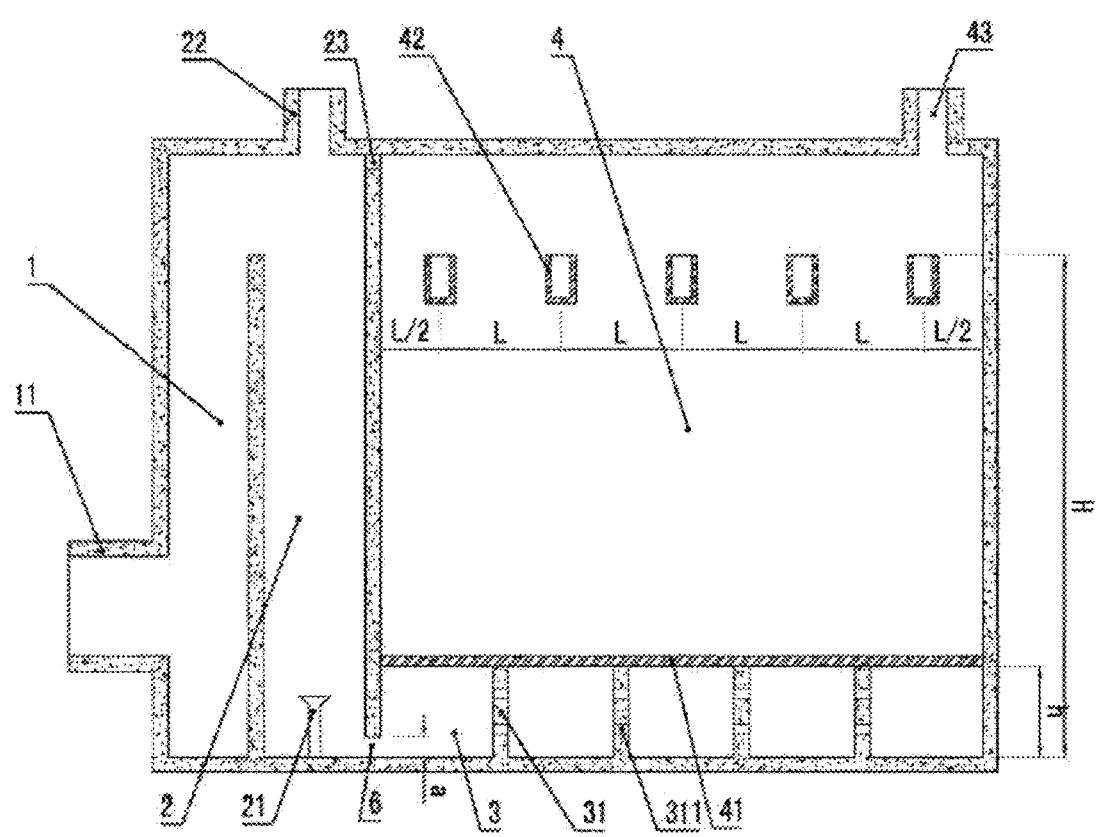
FIG. 2 shows a cross-section diagram in A-A direction of FIG. 1.
Figure 3:
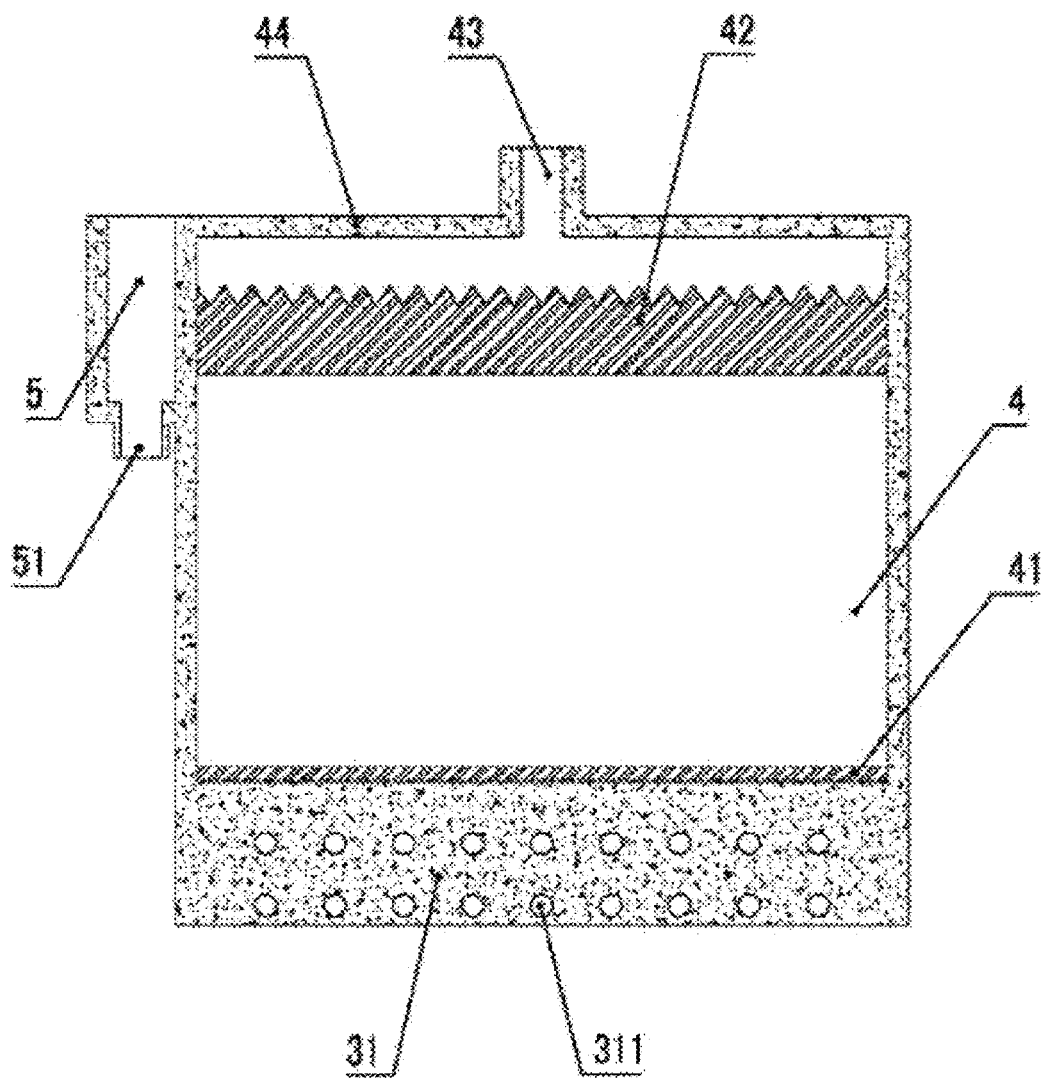
FIG. 3 shows a cross-section diagram in B-B direction of FIG. 1.

The drawing numbers of FIG. 1 to FIG. 3 are: water inlet gallery 1, water inlet 11, aeration gallery 2, aerator 21, the first exhaust port 22, the third communicating hole 23, water distribution zone 3, perforated wall 31, the first communicating hole 311, reaction zone 4, perforated plate 41, triangular effluent weir 42, the second exhaust port 43, cover plate 44, water outlet trough 5, water outlet 51, narrow passage 6.

As shown in FIG. 1 to FIG. 3, an ozone contact tank includes a water inlet gallery 1, an aeration gallery 2, a water distribution zone 3, a reaction zone 4 and a water outlet trough 5 which are disposed according to the intake order and are communicated in sequence; the water inlet end of the water inlet gallery 1 is provided with a water inlet 11, the top of the water inlet gallery 1 is a water outlet end, the top of the aeration gallery 2 is a water inlet end, the top of the water inlet gallery 1 is communicated with the top of the aeration gallery 2; the bottom of the aeration gallery 2 is provided with an aerator 21, the top of the aeration gallery 2 is provided with a first exhaust port 22, the bottom of the aeration gallery 2 is communicated with a water inlet end of the water distribution zone 3 via a narrow passage 6 which is used for improving the liquid flow rate; the top of the water distribution zone 3 is a water outlet end, the bottom of the reaction zone 4 is a water inlet end, the top of the water distribution zone 3 is communicated with the bottom of the reaction zone 4; a perforated plate 41 is arranged between the top of the water distribution zone 3 and the bottom of the reaction zone 4; the perforated plate 41 is provided with a second communicating hole; the second communicating hole is a micropore, the top of the reaction zone 4 is communicated with the water outlet trough 5; the water drainage end of the water outlet trough 5 is provided with a water outlet 51, the top of the reaction zone 4 is covered by a cover plate 44; the cover plate 44 is provided with a second exhaust port 43, and the second exhaust port 43 is connected with an ozone exhaust destruction device via a pipeline. Wherein the cross section of the narrow passage 6 is smaller than that of the aeration gallery 2, and is also smaller than that of the water distribution zone 3; namely, the aeration gallery 2, the narrow passage 6 and the water distribution zone 3 are distributed in a dumbbell shape, which is bigger in two ends, and is smaller in middle; the flow rate of water can be improved via the narrow passage 6, the water can be injected to the water distribution zone 3 with high speed, thus the ozone water with different concentrations in the aeration gallery 2 can be fully and uniformly mixed in the water distribution zone 3.

As shown in FIG. 1 to FIG. 3, the top of the reaction zone 4 is provided with a triangular effluent weir 42, the triangular effluent weir 42 is communicated with the water outlet trough 5, namely, the water in the reaction zone 4 flows through the triangular effluent weir 42, and then drains out from the water outlet trough 5.

As shown in FIG. 1 to FIG. 3, the distance between centre lines of the two adjacent triangular effluent weirs 42 is L, the total height of the reaction zone 4 and the water distribution zone 3 is H, thus L/H is less than 0.2.

As shown in FIG. 1 to FIG. 3, the height H of the reaction zone 4 and the water distribution zone 3 is 5 to 6 meters, the height of the water distribution zone 3 is h, and h is 0.5 to 1.0 meter; the height of the narrow passage (6) is a, and a is 0.10 to 0.20 meter.

As shown in FIG. 1 to FIG. 3, the perforated walls 31 which are vertical to the water flow direction are arranged in the water distribution zone 3; and the perforated walls 31 are provided with first communicating holes 311 which are parallel with the water flow direction; at least two perforated walls 31 are provided and are uniformly distributed with intervals; the first communicating holes 311 are uniformly distributed on the perforated walls 31, so as to realize better plug flow type hydraulic flow state.

As shown in FIG. 1 to FIG. 3, the aeration direction of the aerator 21 is opposite to the water flow direction of the aeration gallery 2, the water flow direction of the water inlet gallery 1 is opposite to the water flow direction of the aeration gallery 2, thus realizing the reverse aeration.

The porosity of the perforated plate 41 is 0.05 to 0.20, namely 5% to 20%; the porosity of the perforated plate 41 is preferably taken as 0.1 to 0.2; the aperture of the second communicating hole is 3 to 5 millimeters, the second communicating holes are uniformly distributed on the perforated plate 41; the water distribution zone 3 and the reaction zone 4 can be communicated via the second communicating hole.

The disclosure also provides an ozone contact method, including the steps as follows:

A, guiding the water into the aeration gallery 2 via the water inlet gallery 1 for reverse aeration;

B, guiding the water in the aeration gallery 2 into the water distribution zone 3 via the narrow passage 6 which can improve the liquid flow rate, and mixing the water in the narrow passage (6) and the water distribution zone;

C, filtering the water in the water distribution zone 3 via the perforated plate 41, and guiding into the reaction 4 upwards for implementing contact reaction and disinfection;

D, draining the water in the reaction zone 4 via the water outlet trough 5.

The utility model provides an ozone contact tank, the water flows into the water inlet gallery 1 from the water inlet 11, flows upwards in the water inlet gallery 1, enters into the aeration gallery 2 from the top of the aeration gallery 2, flows downwards in the aeration gallery 2, and then flows into the water distribution zone 3 via the narrow passage 6 from the bottom of the aeration gallery 2, and then flows into the reaction 4 upwards from the water distribution zone 3 under the effect of the water pump, wherein the water flows in the aeration gallery 2 from up to down, the aeration direction of the aerator 21 is from down to up, the countercurrent aeration increases the turbulent fluctuation of the water flow, thus improving the mass transfer efficiency and mixing effect of the ozone; the narrow passage 6 can make the ozone water with different concentrations in the aeration gallery 2 be fully and uniformly mixed in the water distribution zone 3, and by setting the perforated plate 41 between the water distribution zone 3 and the reaction zone 4, the water in the water distribution zone 3 can be conveyed to the reaction zone 4 via the second communicating hole of the perforated plate 41, the water flow rate can be uniform and stable; and the perforated plate 41 can be combined with the effluent weir 42, so as to realize the hydraulic flow state which is close to the full plug flow type in the reaction zone 4; thereby, the disinfection effect is greatly improved.

The perforated plate 41 is a stainless steel perforated plate, which can prevent the ozone corrosion; the perforated plate 41 can make the water flow rate be uniform and stable, and can be combined with the effluent weir 42 to make the water flow in the reaction zone be close to the full plug flow type, so as to greatly improve the CT value and to guarantee the disinfection effect.

The ozone contact tank is divided into the left tank and the right tank by a partition wall; the left tank is the aeration gallery 2, the right tank is divided into the upper tank and the lower tank via a layer of perorated plate 41; the upper tank is the reaction zone 4, and the lower tank is the water distribution zone 3; a third communicating hole 23 is arranged on the top of the partition wall between the upper end of the aeration gallery 2 and the reaction zone 4, wherein the third communicating hole 23 can communicate the air in the aeration gallery 2 and the reaction zone 4, thus the air circulation can be enhanced.

The ozone contact tank and the ozone contact method provided by the disclosure can increase the turbulent fluctuation of the water flow through the aeration gallery 2 and improve the mass transfer efficiency and mixing effect of the ozone; the narrow passage 6 between the water distribution zone 3 and the aeration gallery 2 makes the ozone water with different concentrations in the aeration gallery 2 be fully and uniformly mixed in the water distribution zone 3; the perforated plate 41 and the effluent weir 42 make the water flow rate be uniformly distributed in the reaction zone to realize the hydraulic flow state which is lose to the full plug flow type, thus improving the disinfection efficiency.

The above contents further describe the disclosure with reference to the specific preferred embodiments in details, but are not intended to limit the specific embodiments of the disclosure. For the normal technical staffs in the field which the disclosure belongs to, various simple deductions or replacements within the concept of the disclosure shall fall in the protection scope of the disclosure.

What is claimed is:

1. An ozone contact method comprising:
   guiding water into an aeration gallery from an water inlet gallery so as to reverse aerate the water in the aeration gallery;
   guiding the water in the aeration gallery into a water distribution zone via a narrow passage so as to increase a local liquid flow rate in the narrow passage and so as to mix the water from the narrow passage in a water distribution zone;
   guiding the water in the water distribution zone upwards to a reaction zone via a perforated plate so as to implement reaction and disinfection, wherein the reaction zone is separated from the aeration zone by the narrow passage and the water distribution zone; and
   draining the water in the reaction zone via a water outlet trough, the step further comprising draining the water in the reaction zone via triangular effluent weirs.

2. An ozone contact method comprising:
   guiding water into an aeration gallery from an water inlet gallery so as to reverse aerate the water in the aeration gallery;
   guiding the water in the aeration gallery into a water distribution zone via a narrow passage so as to increase a local liquid flow rate in the narrow passage and so as to mix the water from the narrow passage in a water distribution zone;
   guiding the water in the water distribution zone upwards to a reaction zone via a perforated plate, the step further comprising guiding the water through perforated walls arranged vertical to the water flow direction arranged in the water distribution zone via first communicating holes arranged parallel with the water flow direction and through the perforated plate via a plurality of second communicating holes via so as to implement reaction and disinfection,
   wherein the reaction zone is separated from the aeration zone by the narrow passage and the water distribution zone; and
   draining the water in the reaction zone via a water outlet trough.

* * * * *